United States Patent
Riedel

(10) Patent No.: US 9,720,011 B2
(45) Date of Patent: Aug. 1, 2017

(54) MONITORING DEVICE AND METHOD FOR MONITORING A MOVEMENT PROFILE OF A USER IN THE REGION OF AN ACTUATING ELEMENT OF AN AIRCRAFT OR SPACECRAFT

(71) Applicant: Airbus Operations GmbH, Hamburg (DE)

(72) Inventor: Christian Riedel, Bliedersdorf (DE)

(73) Assignee: Airbus Operations GmbH, Hamburg (DE)

( * ) Notice: Subject to any disclaimer, the term of this patent is extended or adjusted under 35 U.S.C. 154(b) by 216 days.

(21) Appl. No.: 14/357,538

(22) PCT Filed: Nov. 14, 2012

(86) PCT No.: PCT/EP2012/072555
§ 371 (c)(1),
(2) Date: May 9, 2014

(87) PCT Pub. No.: WO2013/072334
PCT Pub. Date: May 23, 2013

(65) Prior Publication Data
US 2014/0345396 A1     Nov. 27, 2014

Related U.S. Application Data

(60) Provisional application No. 61/560,493, filed on Nov. 16, 2011.

(30) Foreign Application Priority Data

Nov. 16, 2011   (DE) .................. 10 2011 086 454

(51) Int. Cl.
G01P 13/00      (2006.01)
B64D 25/14     (2006.01)
(Continued)

(52) U.S. Cl.
CPC ............. *G01P 13/00* (2013.01); *B64C 1/1407* (2013.01); *B64D 25/14* (2013.01); *B64D 45/00* (2013.01);
(Continued)

(58) Field of Classification Search
CPC ... G01P 13/00; B64D 2045/004; B64D 25/14; B64D 45/00; B64D 2045/45; B64C 1/1407; B64G 1/66
(Continued)

(56) References Cited

U.S. PATENT DOCUMENTS 4,236,180 A  *  11/1980  Cayzac ............ G08B 13/19602
                                                        348/154
4,800,540 A  *  1/1989  Annala ................... G01S 15/04
                                                        367/87
(Continued)

FOREIGN PATENT DOCUMENTS

DE      29 06 681 C2     9/1979
DE      41 13 992 A1     11/1992
(Continued)

OTHER PUBLICATIONS

International Search Report, May 16, 2013.

*Primary Examiner* — Natalie Huls
(74) *Attorney, Agent, or Firm* — Greer, Burns & Crain, Ltd.

(57) ABSTRACT

A monitoring device for monitoring a movement profile of a user in the region of an actuating element of an aircraft or spacecraft, having at least one movement sensor which is configured to detect a first monitoring space of the monitoring device and at the same time a second monitoring space of the monitoring device which differs from the first monitoring space. Also a method for monitoring a movement profile of a user in the region of an actuating element
(Continued)

of an aircraft or spacecraft, with: detection of a first monitoring space of the monitoring device by at least one movement sensor; and simultaneous detection of a second monitoring space, which is different from the first monitoring space, by the at least one movement sensor.

10 Claims, 7 Drawing Sheets

(51) Int. Cl.
  *B64C 1/14* (2006.01)
  *B64G 1/66* (2006.01)
  *B64D 45/00* (2006.01)
(52) U.S. Cl.
  CPC .......... *B64G 1/66* (2013.01); *B64D 2045/004* (2013.01)
(58) Field of Classification Search
  IPC ....................................... G01P 13/00
  See application file for complete search history.

(56) References Cited

U.S. PATENT DOCUMENTS

| | | | | |
|---|---|---|---|---|
| 5,612,685 | A * | 3/1997 | Oliva | G01S 13/56 340/541 |
| 6,304,178 | B1 * | 10/2001 | Hayashida | G01V 8/10 340/545.1 |
| 2002/0150278 | A1 * | 10/2002 | Wustefeld | G06K 9/2036 382/103 |
| 2011/0139934 | A1 * | 6/2011 | Giesa | B64D 25/14 244/137.2 |
| 2016/0019770 | A1 * | 1/2016 | Bredemeier | B64C 1/1423 244/129.5 |
| 2017/0050744 | A1 * | 2/2017 | Bredemeier et al. | B64D 45/00 |

FOREIGN PATENT DOCUMENTS

| | | |
|---|---|---|
| DE | 100 50 083 A1 | 4/2002 |
| DE | 103 10 767 A1 | 12/2003 |
| DE | 102 25 023 A1 | 1/2004 |
| EP | 1 719 084 A1 | 11/2006 |
| EP | 2 108 585 A1 | 10/2009 |
| FR | 2 939 942 A1 | 6/2010 |
| WO | WO 2006114640 A1 | 11/2006 |

* cited by examiner

US 9,720,011 B2

MONITORING DEVICE AND METHOD FOR MONITORING A MOVEMENT PROFILE OF A USER IN THE REGION OF AN ACTUATING ELEMENT OF AN AIRCRAFT OR SPACECRAFT

CROSS-REFERENCES TO RELATED APPLICATIONS

This application is a national phase of International Patent Application No. PCT/EP2012/072555, filed Nov. 14, 2012 which claims the benefit of and priority to the German patent application No. 10 2011 086 454.7, filed Nov. 16, 2011, and U.S. Provisional Application No. 61/560,493, filed Nov. 16, 2011, the entire disclosures of which are incorporated herein by way of reference.

BACKGROUND OF THE INVENTION

The present invention relates to a monitoring device and to a method for monitoring a movement profile of a user in the region of an actuating element of an aircraft or spacecraft. The present invention also relates to a door of an aircraft or spacecraft having a monitoring device of this type and to an aircraft or spacecraft having a monitoring device of this type and/or having a door of this type.

Although the present invention can be applied to any aircraft or spacecraft, it will be described in detail by way of example on the basis of an aircraft.

In an aircraft, in the cabin, particularly on the cabin door, in the cargo region or in or on the cockpit, for example on the cockpit door, there is the possibility of improper operation of the very diverse operating elements, such as switches, actuating and/or release levers, flaps or the like. This often occurs due to ignorance, hectic activities, routine or unintentional operation by the user. In particular, the unintentional opening of the emergency chute which is to be armed by a lever before the opening/release lever of the aircraft door is actuated can entail unwanted costs since the emergency chute has to be repacked, and can cause aircraft delays. Consequently, unwanted idling costs can also arise. To warn the user about an inappropriate actuation of the release lever of the aircraft door, this situation is often directly monitored by a monitoring device. When an emergency chute has been armed, the monitoring device warns the user to actuate the release lever.

EP 1 719 084 B1 describes an alarm system for an aircraft door comprising a sensor for detecting when an operating handle of the door is grasped by an operator, an acoustic alarm which is associated with the sensor and is ready to sound when the sensor detects that the handle is about to be grasped, and a means for automatically activating the sensor and/or the acoustic alarm if an emergency evacuation chute of the aircraft door is configured to be released when the door is opened.

Furthermore, EP 2 108 585 B1 describes a system for preventing the unintentional release of an emergency chute for an aircraft, the system comprising at least one sensor for sensing the proximity of a person in front of an aircraft door, and at least one optical warning means which is configured to provide a visual display in the vicinity of an emergency chute release lever as soon as the sensor detects the proximity of a person in front of the aircraft door.

SUMMARY OF THE INVENTION

It is one idea of the present disclosure to provide an improved monitoring device of an actuating element of an aircraft or spacecraft.

Accordingly, a monitoring device for monitoring a movement profile of a user in the region of an actuating element of an aircraft or spacecraft is provided, comprising at least one movement sensor which is configured to detect a first monitoring space of the monitoring device and at the same time a second monitoring space of the monitoring device which is different from the first monitoring space.

Accordingly, a method for monitoring a movement profile of a user in the region of an actuating element of an aircraft or spacecraft is provided which comprises the following steps: detection of a first monitoring space of the monitoring device by means of at least one movement sensor; and simultaneous detection of a second monitoring space, which is different from the first monitoring space, by means of the at least one movement sensor.

A fundamental idea of the present invention is to provide a monitoring device which simultaneously monitors a first monitoring space and a second monitoring space, which is different from the first monitoring space, by means of a movement sensor. Consequently, the simultaneous monitoring of two different monitoring spaces is possible by the monitoring device. By this measure, for example a first warning stage can be associated with the first monitoring space and a second warning stage can be associated with the second monitoring space, said warning stages warning the user about an actuation of the actuating element. As a result, a clear warning can be obtained in the event of a movement into the danger zone. Furthermore, an unintentional activation of a warning signal is avoided.

According to one embodiment of the monitoring device, said device comprises a control means which is configured to compare an output signal from the at least one movement sensor with values of a table of values stored in the control means. Preferably, first monitoring space values are associated with the first monitoring space and second monitoring space values of the table of values are associated with the second monitoring space. As a result, distance values stored in the table of values can be reliably associated with the first or second monitoring space. Furthermore, a movement profile of the user can be created when the user moves in the monitoring spaces.

According to a further embodiment of the monitoring device, associated with each door of the aircraft or spacecraft is a table of values which is adapted to the respective door, the table of values being stored in the control means of the monitoring device. Consequently, the arrangement and the spatial shape of the monitoring spaces can be adapted, as required, to the constructive peripheral conditions in the region of the actuating element.

According to a further embodiment of the monitoring device, said device comprises a first detection region, and a second detection region, the first detection region and the second detection region overlapping one another at least in portions, the first detection region representing the first monitoring space of the monitoring device, and a differential region of the first detection region and of the second detection region which can only be detected by the second detection region, representing the second monitoring space of the monitoring device. The first monitoring region monitors the first monitoring space. A differential region of the detection regions is produced due to the overlapping of the detection regions. The second monitoring space is monitored by means of this differential region which is only detected by the second detection region and not by the first detection region.

According to a development of the monitoring device, the detection regions are configured spatially, in particular in the shape of a lobe, a length of the second detection region being greater than a length of the first detection region. This measure ensures that the second detection region passes into the first detection region to form the differential region.

According to a possible configuration of the monitoring device, said device comprises a first movement sensor to produce the first detection region and a second movement sensor to produce the second detection region. At least one of the movement sensors for detecting a movement profile of a user is preferably configured as an analog movement sensor. The detection of a movement profile means, for example, that it can be established in good time whether the user is moving in the first monitoring space in the direction of the second monitoring space. The movement sensors preferably each have a signal transmitting means and a signal receiving means. The movement sensors can be configured as ultrasound sensors, infrared sensors, laser sensors or camera sensors or the like. Alternatively, a common movement sensor can be used to produce the first detection region and the second detection region. The monitoring device preferably comprises a control means and a signal-generating means. By means of the control device, the detected movement data is evaluated and, if appropriate, the signal-generating means is activated to output signals. The signal-generating means is preferably configured to output at least two different signals. The signal can be optical, acoustic, haptic or the like. The signal can be a stored recorded message. For example, a warning is given by a recorded message of this type about actuation of the actuating element when an emergency chute is armed.

According to another configuration of the monitoring device, a first center axis of the first detection region is arranged coaxially to a second center axis of the second detection region. This arrangement provides a particularly simple and thus economical construction of the monitoring device.

According to an alternative configuration of the monitoring device, a first center axis of the first detection region is arranged obliquely at an angle to a second center axis of the second detection region. As a result, the spatial positions of the detection regions can advantageously be adjusted relative to one another, as a result of which, for example the differential region can be positioned offset relative to the first detection region. Consequently, the monitoring device can be adapted flexibly to a respective case of use.

According to a further configuration of the method, said method comprises the following steps: production of a first detection region; and production of a second detection region, the first detection region and the second detection region overlapping one another at least in portions, the first monitoring space of the monitoring device being monitored by the first detection region and the second monitoring space of the monitoring device being monitored by a differential region of the first detection region and of the second detection region, which differential region is only monitored by the second detection region.

According to a further configuration of the method, when a user or an object passes into the first monitoring space, a first signal is output by the monitoring device and when the user or the object passes into the second monitoring space, a second signal, different from the first signal, is output by the monitoring device. This means that the method can detect different stages of danger. For example, when the user or object enters the first monitoring space, a first warning signal can be output and when the user or object enters the second monitoring space, a second warning signal which is louder, for example, and which differs from the first warning signal can be output.

BRIEF DESCRIPTION OF THE DRAWINGS

In the following, the invention will be described in more detail on the basis of embodiments with reference to the accompanying schematic figures of the drawings, in which.

In the figures, identical reference numerals denote identical or functionally identical components, unless indicated otherwise.

DETAILED DESCRIPTION OF THE EMBODIMENTS

Figure 1:
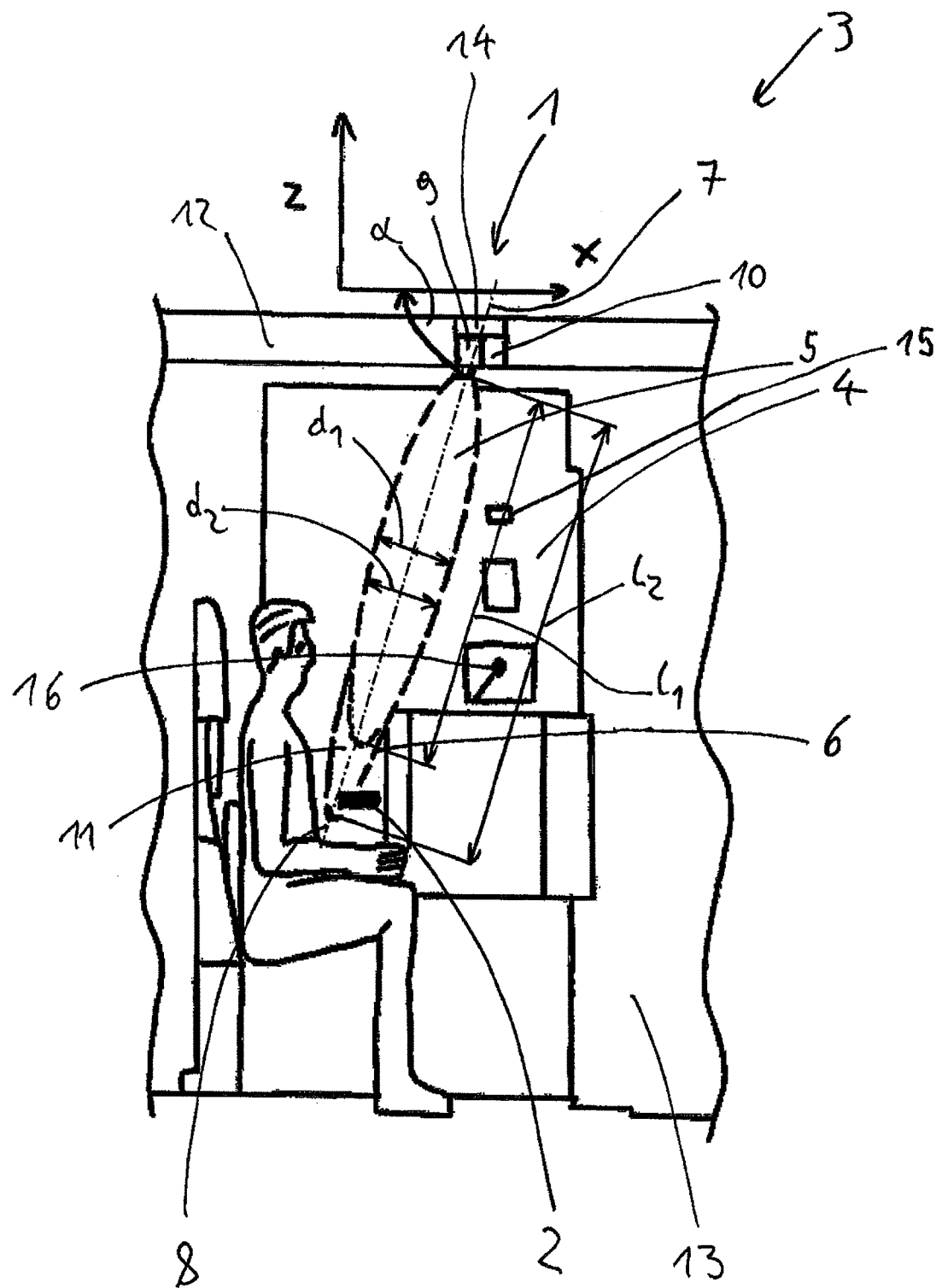
FIG. 1 is a side view of an embodiment of a monitoring device.
Figure 2:
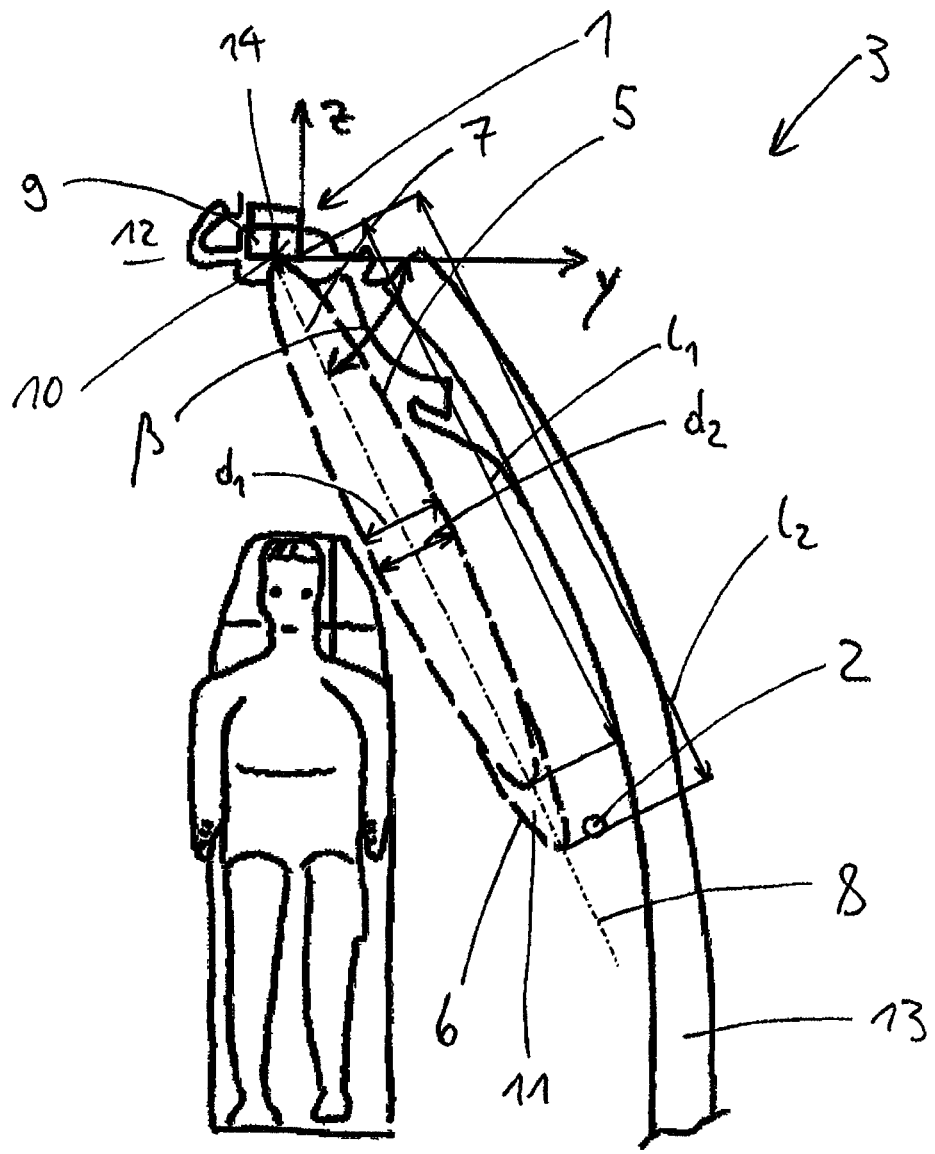
FIG. 2 is a front view of the embodiment of the monitoring device according to FIG. 1.

FIGS. 1 and 2 illustrate a preferred embodiment of a monitoring device 1 for monitoring a movement profile of a user in the region of an actuating element 2 of an aircraft or spacecraft 3. The actuating element 2 can be configured, for example, as an opening/release lever of a door 4 of the aircraft or spacecraft 3 or the like. In the embodiment of the monitoring device 1 according to FIGS. 1 and 2, the monitoring device 1 is configured to monitor an opening/release lever 2 of the door 4. In this respect, the monitoring device 1 serves to prevent the emergency chute of the aircraft or spacecraft 3 from being inadvertently activated by means of a monitoring procedure of the release lever 2.

The monitoring device 1 preferably has a first detection region 5 and a second detection region 6. The monitoring device 1 can have any number of detection regions, for example three or four detection regions. The monitoring device 1 preferably has at least two detection regions 5, 6. In the following, reference will only be made to two detection regions 5, 6, for simplification purposes. The detection regions 5, 6 preferably overlap one another at least in portions. In particular, the second detection region 6 passes into the first detection region 5. The first detection region 5 and the second detection region 6 preferably differ from one another. The detection regions 5, 6 are preferably configured as spatial detection regions 5, 6. In particular, the detection regions 5, 6 are approximately in the shape of a lobe. Alternatively, the detection regions 5, 6 can be conical, cylindrical or they can be configured with any rotationally symmetrical shape. The detection regions 5, 6 preferably have an approximately identical three-dimensional shape. In particular, the first detection region 5 has a first center axis 7 and the second detection region 6 has a second center axis 8. The center axes 7, 8 are preferably arranged coaxially. The detection regions 5, 6 are preferably configured rotationally symmetrically to the center axes 7, 8 thereof. The detection regions 5, 6 extend from the monitoring device 1 along their respective center axes 7, 8. One of the detection regions 5, 6 preferably has along the center axes 7, 8 a greater length than the other detection region 5, 6. In particular, the second detection region 6 has a greater length than the first detection region 5. The first detection region 5 preferably has a length $l_1$ from the monitoring device 1 along the center axis 7. The second detection region 6 preferably has a length $l_2$ from the monitoring device 1 along the center axis 8, the length $l_2$ being in particular greater than the length $l_1$. A respective so-called lobe diameter $d_1$, $d_2$ of the detection regions 5, 6 is preferably determined on a greatest diameter of the corresponding detection region 5, 6. In particular, the lobe diameters $d_1$, $d_2$ of the detection regions 5, 6 are the same size.

The monitoring device 1 is configured to detect a movement by an object or a user in the first detection region 5 and in the second detection region 6. To produce the first detection region 5, the monitoring device 1 preferably has a first movement sensor 9. To produce the second detection region 6, the monitoring device 1 preferably has a second movement sensor 10. To produce the detection regions 5, 6, the movement sensors 9, 10 preferably have in each case a transmitting means and a receiving means, for example an ultrasonic transmitter and an ultrasonic receiver. The movement sensors 9, 10 can be configured as infrared sensors, laser sensors, camera sensors or the like. Alternatively, the monitoring device 1 can have only one movement sensor which is configured to produce both detection regions 5, 6. The movement sensors 9, 10 are preferably configured as sensors with a digital, analog or serial interface. Alternatively, the movement sensors 9, 10 or at least one of the movement sensors 9, 10 can be configured with a digital, analog or serial interface.

The first detection region 5 and the second detection region 6 preferably overlap one another at least in portions. In particular, the second detection region 6 passes into the first detection region 5 and projects beyond the first detection region 5, for example along the centre axes 7, 8. In particular, the second detection region 6 completely covers the first detection region 5. The first detection region 5 of the monitoring device 1 is configured to detect a first monitoring space. The first monitoring space preferably corresponds to the first detection region 5. The overlap, at least in portions, of the first detection region 5 and of the second detection region 6 produces a differential region 11, particularly a first differential region 11 of the first detection region 5 and of the second detection region 6. This differential region 11 corresponds to a portion of the second detection region 6, which does not overlap the first detection region 5. The differential region 11 is configured to detect a second monitoring space of the monitoring device 1. In particular, the differential region 11 corresponds to the second monitoring space. The second monitoring space is preferably provided such that the actuating element 2 is arranged therein or such that entry is to be made into the second monitoring space for actuation of the actuating element 2. The actuating element 2 can be arranged, for example, downstream of the second monitoring space.

The monitoring device 1 is preferably mounted in an overhead region 12 of a fuselage 13 of the aircraft or spacecraft 3. In particular, the monitoring device 1 is fitted above the doors 4 of the aircraft or spacecraft 3. The monitoring device 1 is preferably provided such that the center axes 7, 8 of the detection regions 5, 6, as illustrated in FIG. 1, extend diagonally above the doors 4 from the overhead region 12 towards the actuating element 2. In particular, the center axes 7, 8 extend from the overhead region 12 at an angle α relative to a longitudinal direction x of the fuselage 13 towards the actuating element 2. A vertical direction z of the fuselage 13 is positioned vertically to the longitudinal direction x. As illustrated in FIG. 2, in a front view of the fuselage 13, the center axes 7, 8 extend obliquely towards the actuating element 2 at an angle β relative to a transverse direction y of the fuselage 13.

The monitoring device 1 has in particular a control means 14 and at least one signal-generating means 15. The control means 14 is preferably configured as an evaluation means 14 or as a controller 14. The signal-generating means 15 is preferably configured to emit, as required, at least one signal, in particular an optical or acoustic signal. The signal can also be configured as a stored recorded message which warns a user about the actuation of the actuating element 2. In particular, the signal-generating means 15 is configured to emit a plurality, in particular at least two different signals, for example an optical signal and an acoustic signal, two different optical signals, two different acoustic signals or the like.

The monitoring device 1 is capable of generating a first signal by means of the signal-generating means 15 when an object or a user passes into the first monitoring space, i.e. into the first detection region 5. The monitoring device 1 is also configured to generate a second signal when the object or the user passes into the second monitoring space, i.e. into the differential region 11.

In the following, the operation of the monitoring device 1 will be described on the basis of what is known as an "optimized door operation" system (ODO system), In particular, the monitoring device 1 forms the ODO system. The ODO system prevents an unintentional release of an emergency chute of the aircraft or spacecraft 3. The emergency chute can be manually armed or disarmed by means of a control lever 16. The emergency chute is preferably fitted in a lower portion of the door 4 and unfolds when it is armed, upon actuation of the release lever 2 of the door 4.

Figure 3:
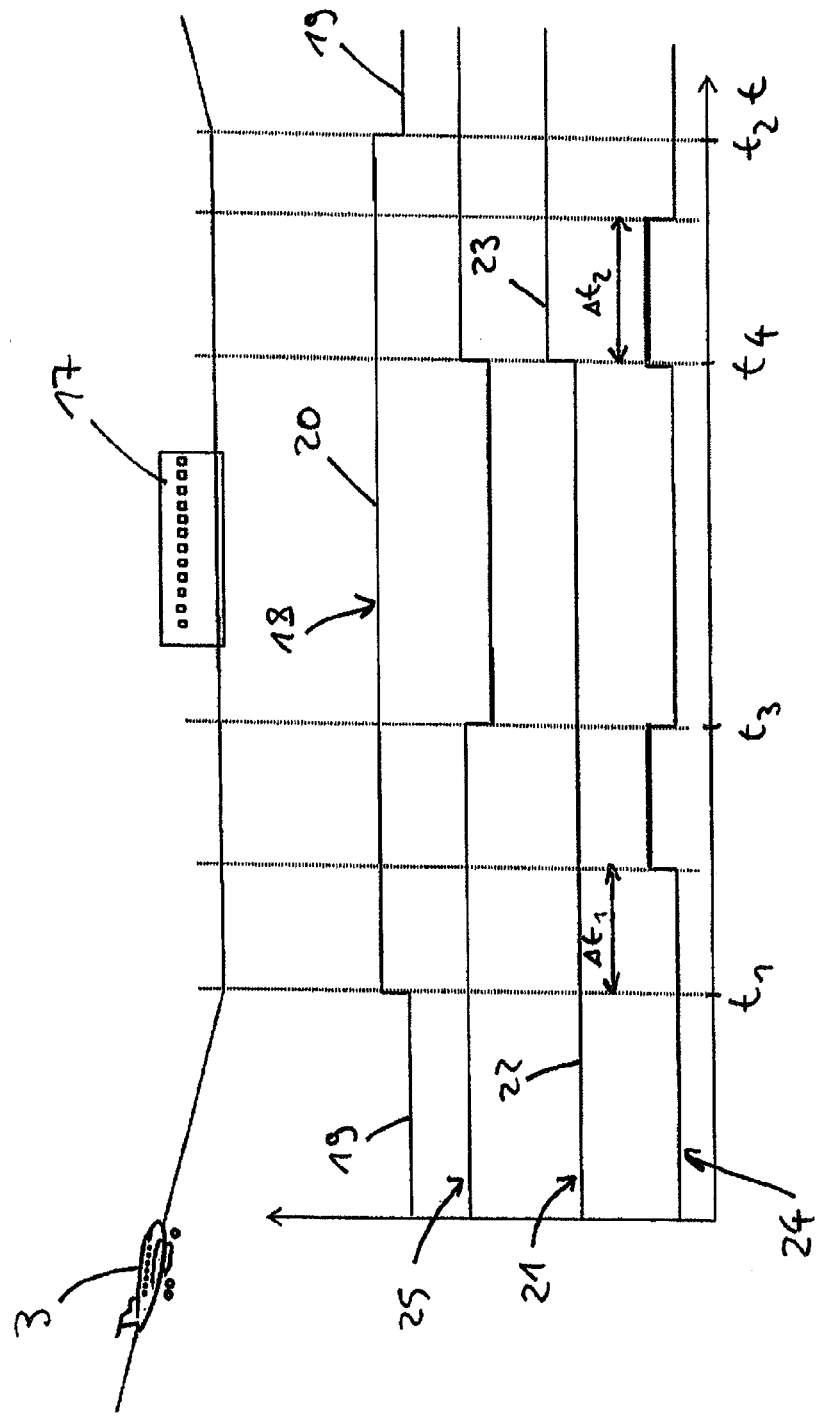
FIG. 3 is an illustration of an activation logic of the embodiment of the monitoring device according to FIG. 1.

FIG. 3 illustrates by way of example an activation logic of the monitoring device 1. For example, the aircraft or spacecraft 3 lands at a time $t_1$ and takes off at a time $t_2$. The aircraft or spacecraft 3 can be parked in a hangar 17 between the times $t_1$, $t_2$. Contact with the ground by an undercarriage of the aircraft or spacecraft 3 at time $t_1$ or the loss of ground contact at time $t_2$ can be detected by an appropriate sensor system. For example, a change in the hydraulic pressure of a hydraulic system of the undercarriage can be monitored. A logic level 18 of this sensor system is illustrated in FIG. 3. Reference numeral 19 denotes the signal level of the sensor system when the aircraft or spacecraft 3 is in the air. Reference numeral 20 denotes the signal level when the aircraft or spacecraft 3 is on the ground. Ground contact is affirmed between the times $t_1$, $t_2$, and it is negated before time $t_1$ and after time $t_2$.

A speed signal is also detected which is represented by a logic level 21. In this respect, a distinction is made as to whether a predetermined speed of the aircraft or spacecraft 3, for example a take-off speed, is not met or is exceeded. When the predetermined speed is not met, a signal level is denoted by reference numeral 22, and when the predetermined speed is exceeded, a signal level is denoted by reference numeral 23.

The monitoring device 1, the activation state of which is illustrated by a logic level 24, is activated after the time $t_1$, for example after the expiry of a predetermined time interval $\Delta t_1$. The predetermined time interval $\Delta t_1$ is, for example, 60 seconds. At the end of the predetermined time interval $\Delta t_1$, when ground contact of the aircraft or spacecraft 3 has been established, it can be assumed that a safe landing has taken place. At the end of the time interval $\Delta t_1$, the aircraft or spacecraft 3 can be taxiing for example or preferably can be stationary. As soon as the monitoring device 1 has been activated, it monitors the release lever 2 of the door 4. The monitoring device 1 is preferably deactivated by actuation of the control lever 16 which switches the emergency chute from an armed state to a disarmed state. A logic level 25 of a sensor system monitoring the control lever 16 illustrates a disarming of the emergency chute at a time $t_3$ and illustrates a re-arming of the emergency chute by the control lever 16 at a time $t_4$.

Figure 4:
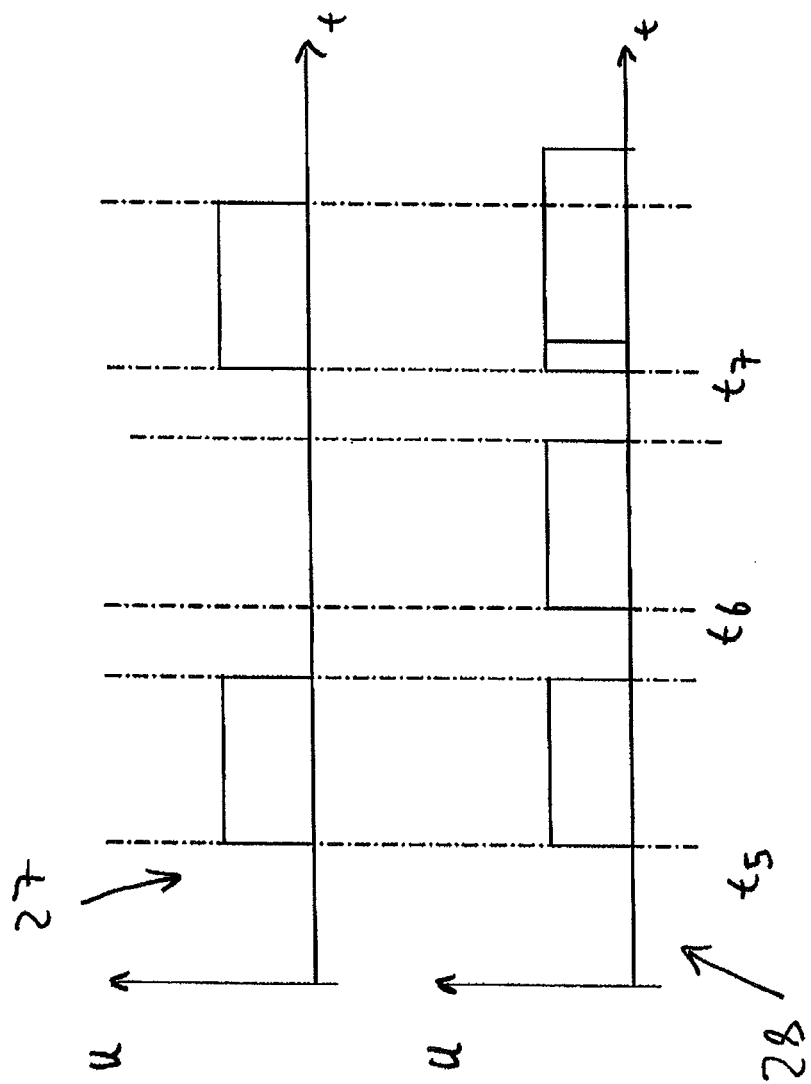
FIG. 4 is an illustration of examples of signal outputs of the embodiment of the monitoring device according to FIG. 1.

In this respect, FIG. 4 schematically illustrates signal outputs of the activated monitoring device 1. The longitudinal axis illustrates a time characteristic t and the vertical axis illustrates a level of an output signal, for example a voltage U. A logic level 27 is associated with the first detection region 5 and a logic level 28 is associated with the second detection region 6. If, at time $t_5$, a user, for example a passenger or a crew member, approaches the release lever 2 through the first monitoring space, i.e. through an overlapping space of the first detection region 5 and of the second detection region 6, a voltage signal is output for both detection regions 5, 6, which is evaluated by the control means 14. The control means 14 evaluates the presence of voltage signals of both the first and the second detection regions 5, 6 with the result that initially there is still no risk of an unintentional actuation of the release lever 2. By activation of the signal-generating means 15, the control means 14 can output a first signal, for example an optical signal and/or an acoustic signal. Alternatively, the control means 14 can be configured such that it does not output a signal in the current operating state.

If, at time $t_6$, the passenger or the crew member approaches the release lever 2 through the differential region 11, i.e. only through the second detection region 6, the monitoring device 1 only outputs a voltage signal for the second detection region 6, and not for the first detection region 5. The control means 14 evaluates the presence of a voltage signal only for the second detection region 6, and determines that the passenger or the crew member is located in the differential region 11 and is thus in the immediate vicinity of the release lever 2. The control means 14 activates the signal-generating means 15 such that a second optical and/or acoustic signal is output which is distinctly different from the first signal. The user is made aware, at the latest by the second signal, that the emergency chute has been armed and will be activated upon actuation of the release lever 2. The signal indicates to the user that he/she should disarm the emergency chute by the control lever 16 before actuation of the release lever 2. The signal can be configured such that an illuminated symbol, for example, indicates the activated emergency chute.

If, for example at a time $t_7$, the user moves out of the first monitoring space into the second monitoring space, when the user is in the first monitoring space a signal is generated both from the first detection region 5 and from the second detection region 6. When the user leaves the first monitoring space, a signal is generated only from the second detection region 6. Consequently, the monitoring device 1 can detect a simple movement profile of the user. Thus, the monitoring device 1 can analyze a movement profile of the user in the detection regions 5, 6. Preferably, when the user moves in the first monitoring space, no warning is given and when the user moves into the second monitoring space, a warning signal is transmitted.

Again with reference to FIG. 3, the monitoring device 1 is reactivated for a predetermined time interval $\Delta t_2$ at time $t_4$ with arming of the emergency chute by the control lever 16. For example, the monitoring device 1 is deactivated again immediately before the aircraft or spacecraft 3 takes off.

In an alternative, but equally preferred development of the monitoring device 1 according to FIGS. 1 and 2, said monitoring device 1 only has one movement sensor 9, 10. The movement sensor 9, 10 preferably has a lobe-shaped detection region. The lobe-shaped detection region of the movement sensor 9, 10 preferably corresponds to the second detection region 6 according to the previously described embodiments of the monitoring device 1. An output signal from the movement sensor 9 is preferably a linear current or voltage signal or a serial data transmission, the information content of which changes continuously subject to the distance of the user from the movement sensor 9. The control means 14 can analyze this output signal from the movement sensor 9 to detect a movement profile of the user.

A table of values is preferably stored in the control means 14 for detecting the movement profile of the user. The values of this table are correlated with the output signal of the movement sensor 9, 10 by the control means 14. For example, the current distance of the user from the monitoring device 1 can be established by associating the current output signal of the movement sensor 9, 10 with a corresponding value of the table of values. The table of values is preferably stored in the control means 14. The first and second monitoring spaces of the monitoring device 1 can be generated virtually by an appropriate association of the table of values. Preferably, first monitoring space values are associated with the first monitoring space and second monitoring space values of the table are associated with the second monitoring space. In particular, the first detection region 5 which corresponds to the first monitoring space, and the differential region 11 which corresponds to the second monitoring space are generated virtually by the control means 14 using the table of values. For each door 4 of the aircraft or spacecraft 3, the table can have different values, and thereby different monitoring spaces. Preferably associated with each door 4 is a monitoring device 1, the control means 14 or external controller 14 of which has a door-specific table of values. Furthermore, a plurality of tables of values can be stored in one control means 14, for example each door 4 can have an individual table of values stored therein. This means that it is conveniently possible to adapt the monitoring spaces of the monitoring device 1 to installation space situations, such as the arrangement of the rows of seats in the region of the respective doors 4.

The movement sensor 9, 10 preferably has a transmitting/receiving unit and a preferably internal computer controller. In one embodiment of the movement sensor 9, 10, the evaluation is made whether the user is located in the monitoring spaces over time. In a further embodiment of the movement sensor 9, 10, a current or voltage signal or a data item is output subject to the movement of the user in the monitoring spaces. This signal can be transformed in an analog or digital manner by an external electronics module or by an external controller, in particular by the control means 14 of the movement sensor 9, 10.

In this embodiment of the movement sensor 9, 10, it is possible to dispense with what is known as a teaching mode, thereby simplifying the use of a movement sensor 9, 10 of this type. In a further configuration of the movement sensor 9, 10, said movement sensor 9, 10 provides the control means 14 with an output signal via a serial interface. An established distance of the user from the movement sensor 9, 10 is compared with a reference table stored in the control means 14, thereby making it possible to associate the current position of the user with the first or the second monitoring space. In this embodiment, it is possible to dispense with a teaching mode.

Figure 5:
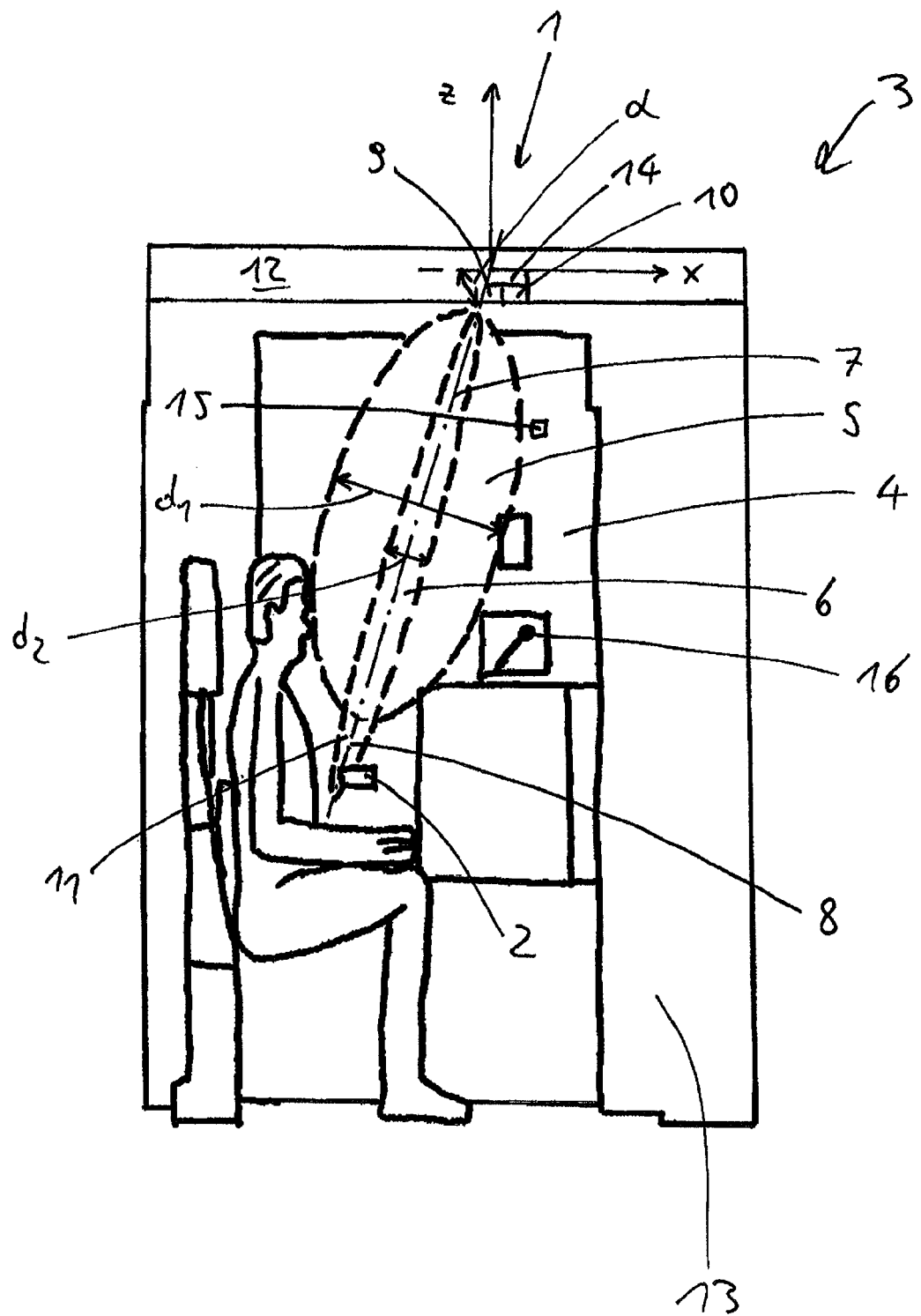
FIG. 5 is a side view of a further embodiment of a monitoring device.
Figure 6:
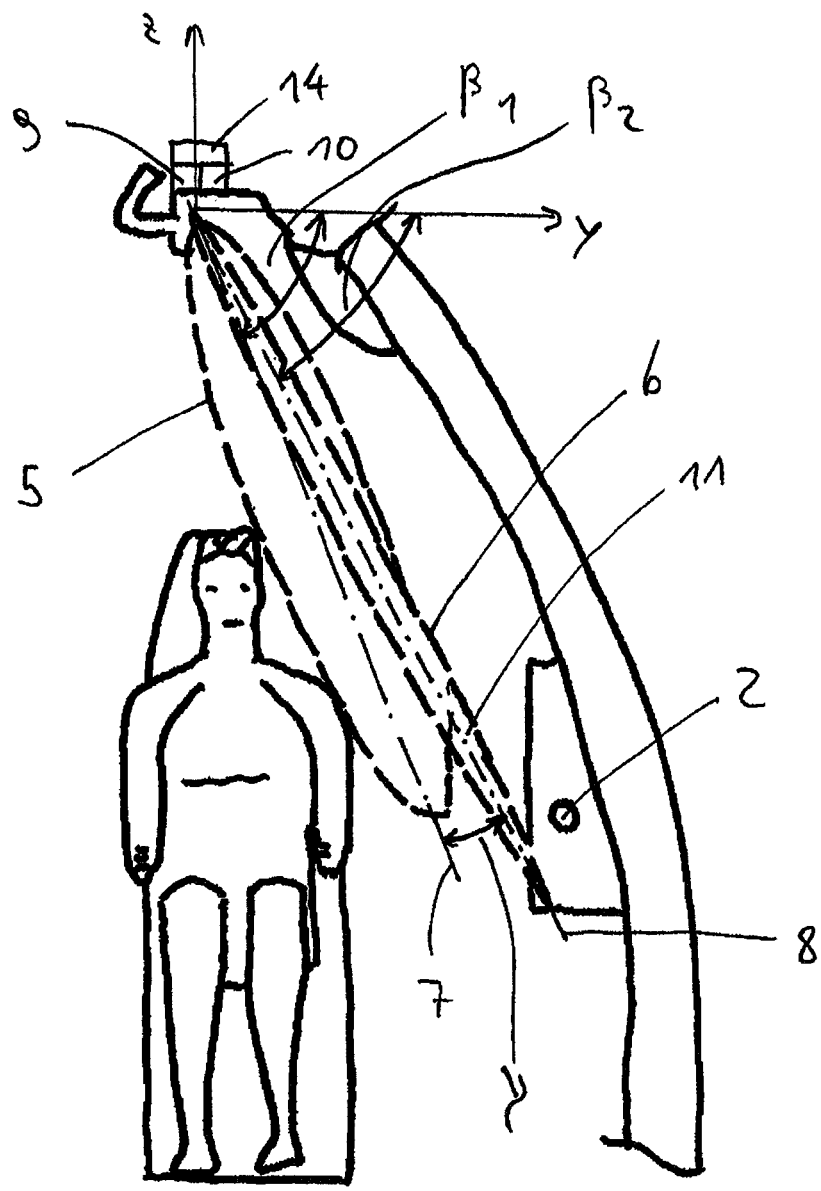
FIG. 6 is a front view of the embodiment of the monitoring device according to FIG. 5.

FIGS. 5 and 6, to which reference will be made simultaneously in the following, illustrate a further preferred embodiment of a monitoring device 1. In the following, only differences of the monitoring device 1 according to FIGS. 5 and 6 compared to the preferred embodiment of the monitoring device 1 according to FIGS. 1 and 2 will be described. The first detection region 5 preferably has a greater lobe diameter $d_1$ than the lobe diameter $d_2$ of the second detection region 6. In particular, the center axes 7, 8 of the detection regions 5, 6 are not arranged coaxially to one another. The center axes 7, 8 are inclined by the angle $\alpha$ relative to the longitudinal direction x of the fuselage 13. Relative to the transverse direction y, the first center axis 7 of the first detection region 5 is inclined by an angle $\beta_1$ and the second center axis 8 of the second detection region 6 is inclined by an angle $\beta_2$. The angle $\beta_1$ is preferably greater than the angle $\beta_2$. The center axes 7, 8 are particularly arranged at an angle $\gamma$ relative to one another. At least one of the movement sensors 9, 10 is preferably configured as an analog sensor. For example, the movement sensor 9 of the first detection region 5 is configured as an analog sensor. As a result, a movement profile of the user can be detected in the first detection region.

Figure 7:
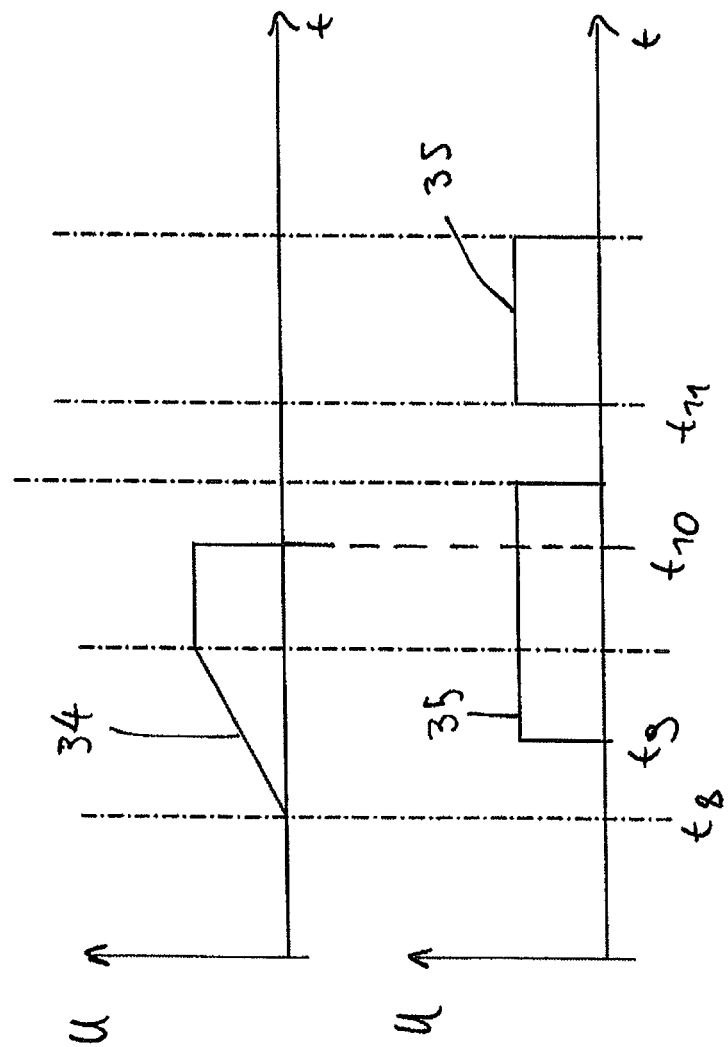
FIG. 7 is an illustration of examples of signal outputs of the embodiment of the monitoring device according to FIG. 5.

In this respect, FIG. 7 schematically illustrates signal outputs of the activated monitoring device 1. The longitudinal axis illustrates a time characteristic t, and the vertical axis illustrates a level of an output signal from the movement sensors 9, 10, for example a voltage U. If the user moves, for example at a time is into the first detection region 5, a signal level 34 of the movement sensor continuously rises with a further movement into the first detection region 5 in the direction of the release lever 2. As soon as the user moves into the second detection region 6 at a time $t_9$, the movement sensor 10 also emits a corresponding signal level 35. The control means 14 interprets the presence of a signal from the first movement sensor 9 and from the second movement sensor 10 to mean that the user is moving in the first detection space and as yet there is no danger. The signal-generating means 15 can output a first signal which changes, for example, with an increasing approach to the release lever 2, in that it becomes louder or the tone thereof changes, for example. Alternatively, it is possible to dispense with the first signal. If, for example, the user leaves the first monitoring space at a time $t_{10}$ and moves into the differential region 11, the control means 14 receives only one signal from the second detection region 6. The signal-generating means 15 generates a distinct second signal which is different from the first signal. If the user moves directly up to the release lever 2 at a time $t_{11}$, without passing into the first monitoring space, only the signal level 35 is generated which is associated with the second detection region 6. The signal-generating means 15 generates the second warning signal in this operating state. In particular, the monitoring device 1 can analyze a movement profile of the user in front of the door 4 of the aircraft or spacecraft 3. As a result, a premature and/or unintentional release of a warning can be reliably prevented and a warning can be released in a defined manner.

The materials, numerical information and dimensions given are to be understood as examples and merely serve to describe the embodiments and developments of the present invention.

Of course, the invention can also be used in other fields, particularly in vehicle construction and in shipbuilding.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:

1. A monitoring device for monitoring a movement profile of a user in the region of an actuating element of an aircraft or spacecraft, comprising:
    at least one movement sensor which is configured to detect a first monitoring space of the monitoring device and at the same time a second monitoring space of the monitoring device which differs from the first monitoring space;
    a first detection region, which is elliptically shaped; and
    a second detection region, which is elliptically shaped, the first detection region and the second detection region extending from the monitoring device along their respective major axes and overlapping each other at least in portions, the first detection region representing the first monitoring space of the monitoring device, and a differential region of the first detection region and of the second detection region, which can only be detected by the second detection region, representing the second monitoring space of the monitoring device;
    wherein the detection regions are configured spatially with a length along the respective major axis of the second detection region being greater than a length along the respective major axis of the first detection region, and
    wherein the major axis of the first detection region is arranged coaxially to the major axis of the second detection region.

2. The monitoring device according to claim 1, wherein the monitoring device comprises a control device which is configured to compare an output signal from the at least one movement sensor with values of a table of values stored in the control device.

3. The monitoring device according to claim 2, wherein first monitoring space values of the table of values are associated with the first monitoring space and second monitoring space values of the table of values are associated with the second monitoring space.

4. The monitoring device according to claim 2, wherein associated with each door of the aircraft or spacecraft is a table of values adapted to the respective door, the table of values being stored in the control device of the monitoring device.

5. The monitoring device according to claim 1, wherein the monitoring device has a first movement sensor to produce the first detection region and a second movement sensor to produce the second detection region.

6. The monitoring device according to claim 1, wherein the major axis of the first detection region is arranged obliquely at an angle to the major axis of the second detection region.

7. The monitoring device according to claim 1 further comprising:
    a door for an aircraft or spacecraft.

8. The monitoring device according to claim 1 further comprising an aircraft or spacecraft.

9. A method for monitoring a movement profile of a user in the region of an actuating element of an aircraft or spacecraft, comprising:
- detecting a first monitoring space of the monitoring device using at least one movement sensor; and
- simultaneously detecting a second monitoring space, which is different from the first monitoring space, using the at least one movement sensor;
- producing a first detection region, which is elliptically shaped; and
- producing a second detection region, which is elliptically shaped, the first detection region and the second detection region extending from the monitoring device along their respective major axes and overlapping one another at least in portions, the first detection region monitoring the first monitoring space of the monitoring device and a differential region of the first detection region and of the second detection region, which is only monitored by the second detection region, monitoring the second monitoring space of the monitoring device;
- wherein the detection regions are configured spatially with a length along the respective major axis of the second detection region being greater than a length along the respective major axis of the first detection region, and
- wherein the major axis of the first detection region is arranged coaxially to the major axis of the second detection region.

10. The method according to claim 9, wherein, when an object moves into the first monitoring space, a first signal is output by the monitoring device and when the object moves into the second monitoring space, a second signal which is different from the first signal is output.

* * * * *